June 1, 1965  J. G. AYERS  3,186,149
FILTER BOX ASSEMBLY
Filed April 19, 1962  2 Sheets-Sheet 1

INVENTOR.
JOSEPH G. AYERS
BY
Kane, Dalsimer and Kane
ATTORNEYS

June 1, 1965  J. G. AYERS  3,186,149
FILTER BOX ASSEMBLY
Filed April 19, 1962  2 Sheets-Sheet 2
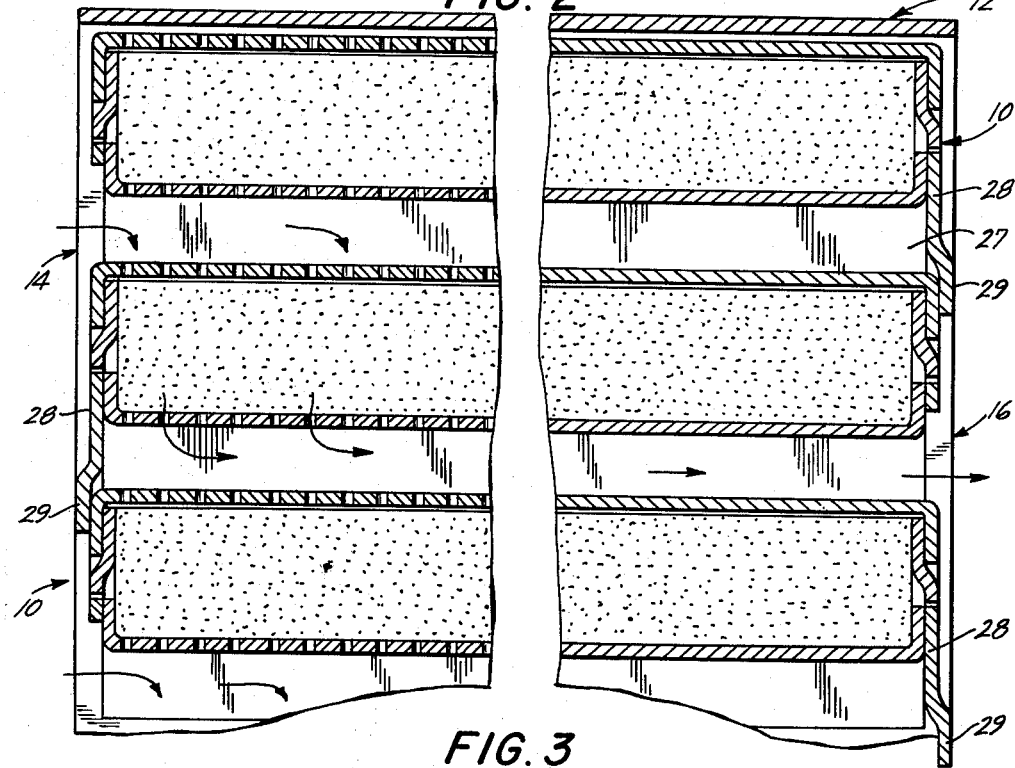
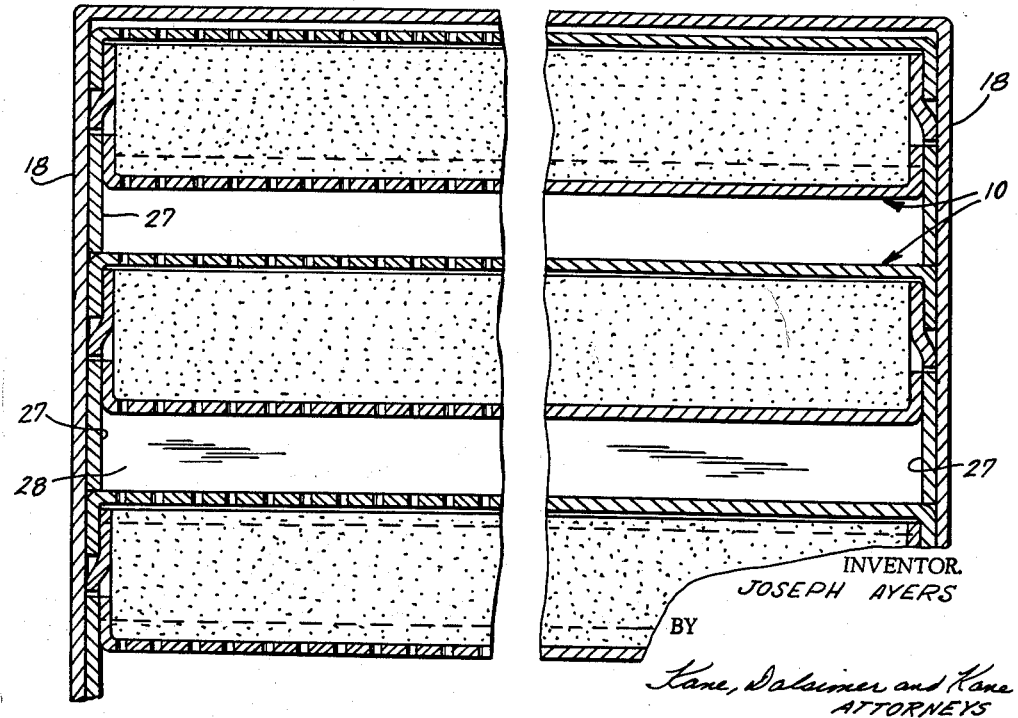
INVENTOR.
JOSEPH AYERS
BY
Kane, Dalsimer and Kane
ATTORNEYS

United States Patent Office 3,186,149
Patented June 1, 1965

3,186,149
FILTER BOX ASSEMBLY
Joseph G. Ayers, Westhampton, N.Y., assignor to Flanders Filters, Inc., Riverhead, N.Y., a corporation of New York
Filed Apr. 19, 1962, Ser. No. 188,682
8 Claims. (Cl. 55—387)

This invention relates to an improved filter box assembly, and more particularly to an improved filter box for holding activated charcoal and other granular filter material and which is assembled in stacked relationship with other similar filter boxes in an air or gas stream to remove impurities therefrom.

Filter boxes of this general type have perforated top and bottom panels and imperforate side walls. They are arranged in spaced superimposed relationship in a cabinet open at its front and rear faces and closed at its two sides. A stream of gaseous material is introduced at the entry or front face between adjacent boxes. The spaces between the boxes are so baffled that the gaseous material must travel through one or more of the filter boxes before exiting at the rear or exit face of the cabinet. Granular filter material such as activated charcoal, alumina or silica is packed in the filter boxes to filter or screen out particulate material and adsorb impurities in gaseous vapor or liquid phase.

The filter boxes of this type heretofore available have presented recognized difficulties and disadvantages. Thus, they have been made of multiple parts and accordingly have been relatively expensive, difficult and time-consuming in making and assembling. Also, the filter boxes heretofore available have embodied a separate frame structure which reduced the space available for the activated charcoal or other granular filter material. From time to time, it is necessary to open the filter boxes to replace or to activate the granular filter material. The opening and closing of the filter boxes heretofore available has been a difficult and time-consuming operation.

It is a particular object of the present invention to overcome the difficulties and disadvantages heretofore encountered and to provide an improved filter box assembly which is of relatively simple and inexpensive construction, which is relatively easy to manufacture and assemble, which has a minimum of waste space and can accommodate a maximum amount of activated charcoal or other granulated filter material, which can be readily opened and closed to replace or reactivate the granular filter material and which is so constructed as to be self-stacking and self-baffling so that the filter boxes can be superimposed one upon the other and will be in properly spaced and baffled relationship without the necessity of external supports or baffles.

It is a further object of the present invention to provide an improved filter box assembly in which the box is releasably retained in assembled or closed position by means of an improved fastening device.

My invention contemplates the provision of an improved filter box assembly comprising first and second complementary box members with side walls having telescopic engagement with each other. Three of the side walls of one of the members are relatively longer than the other side wall and serve to support and space the boxes from each other when in stacked relationship and also serve as baffles to prevent the passage of gaseous material and also helping to serve to keep the stacked boxes in alignment. According to another aspect of my invention, improved fastening means are provided in the form of recesses in the walls of one of the members and complementary detents integrally formed with the walls of the other member and comprising cantilevers facing away from the free ends of the walls and terminating in abutment faces which confront the edges of the recesses when they are interengaged to thereby retain the box members in assembled relationship.

In the accompanying drawings:

FIG. 2 is an enlarged cross-sectional view in the direction of the arrows on the line 2—2 of FIG. 1;

FIG. 3 is an enlarged cross-sectional view in the direction of the arrows on the line 3—3 of FIG. 1;

Figure 1:
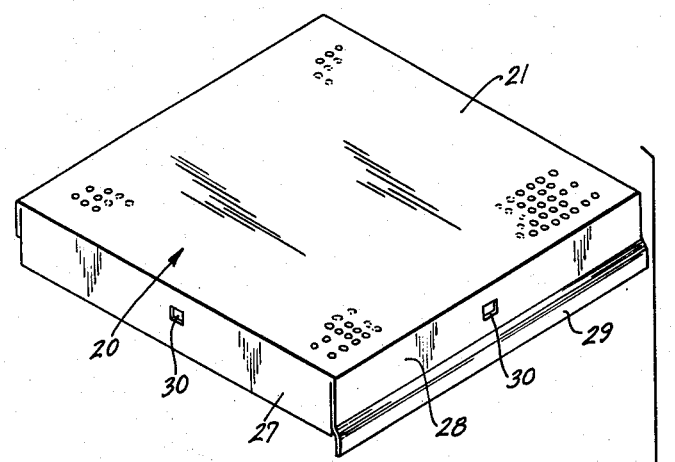
FIG. 1 is a perspective view of a cabinet having therein stacked or superimposed filter boxes embodying my invention.
Figure 4:
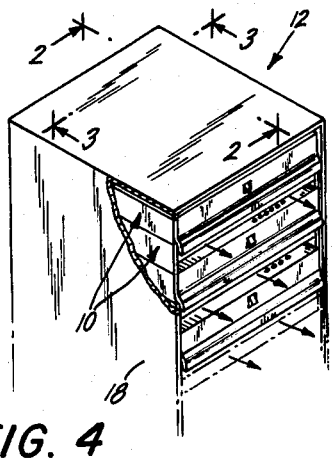
FIG. 4 is an exploded view of the complementary box members prior to assembly.

In the accompanying drawings my improved filter boxes are shown generally at 10. In FIGS. 1, 2 and 3 a plurality of the filter boxes are shown in stacked, spaced superimposed relationship within a cabinet 12. The cabinet is provided with an open front or entry face 14 and an open rear or exit face 16 through which the gaseous material to be treated may flow in a continuous stream. Due to the baffle arrangement, as hereinafter described, the gaseous material entering into the entry face 14 will follow the paths indicated by the arrows in FIG. 2, that is the gaseous material will pass through one or more of the filter boxes. The cabinet is preferably provided with enclosed side walls 18 as shown.

The stacked filter boxes are similar to each other. Each filter box is formed of two complementary box members having telescopic engagement with each other. Thus, I have shown a first member 20 preferably serving as the cover member and a second member 22 preferably serving as the box or base member. The cover and base members are each formed of a rectangular transverse perforated panel 21 and 23 respectively from which peripheral side walls extend at approximately right angles thereto. The perforations in the transverse members are small enough to retain the activated charcoal or other granulated filter material within the filter box but large enough and in sufficient quantity to provide free circulation for the stream of gaseous material.

The transverse panel 21 of the cover member is preferably slightly larger than the transverse panel 23 of the base or box member 22. Similarly, the side walls of the cover member 20 are spaced a slightly greater distance apart than the side walls of the base or box member 22 with the result that the side walls of the cover member have sliding overlapping engagement with the side walls of the box member.

The side walls 25 of the box member are of uniform height as shown. However, three of the side walls of the cover member 20 are of greater height than the fourth side wall 26 which, as shown, is somewhat shorter than the remaining walls. The opposite side walls 27 of the cover member of greater height extend beyond the box when the base and cover members are assembled and are adapted to rest on the adjacent lower box when the filter boxes are in stacked relationship. Thus, the side walls 27 serve to maintain the stacked boxes in properly spaced relationship.

The fourth side wall 28 of the cover member is of somewhat greater height than the side walls 27 and is offset outwardly as shown at 29 providing an offset flange which is adapted to overlap the upper edge of the adjacent lower box as shown most clearly in FIG. 2.

The side wall 28 along with the two side walls 27 serve a baffling function so as to prevent by-passing of the filter boxes by the gaseous stream. The side wall 28, due to the provision of the laterally offset flange 29, also serves to maintain the stacked boxes in properly aligned relationship as shown in FIG. 2. Thus, it will be seen that the stacked boxes are oriented successively at 180 degrees to each other. The gas entering the space between the filter boxes must thus pass through the filter boxes in order to exit through the other face of the cabinet.

Suitable releasable fastening means are provided to retain the cover and base members in closed or assembled relationship. The preferred fastening means comprises recesses 30 formed through the side walls of the cover member 20 and complementary detents 31 integrally formed with the side walls of the base or box member 22.

The detents 31 are in the form of cantilevers which are integrally connected to the side walls at the end nearest the outer end of the side walls and the cantilevers extend downwardly and outwardly at an angle and are provided with a flat abutment face at the end thereof facing away from the outer end of the side walls. In other words, the cantilever detents 31 are offset outwardly out of the plane of the side walls 25 of the base member into the plane of the corresponding side walls of the cover member 20. The free end of the cantilever detents are of a size and shape to fit into the recesses and they are in registry with the recesses when the cover and base members are fully closed. When the detents are thus in engagement with the recesess, the flat abutment faces thereof confront the edges of the recesses to thereby retain the cover and box members in assembled relationship. In order to remove the cover, the detents may be pressed inwardly thereby releasing the interengagement.

Figure 5:
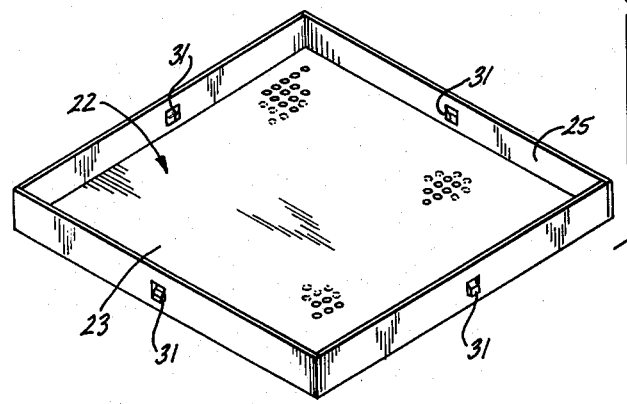
FIG. 5 is a perspective view of a modified form of filter box having apertures through the center thereof to accommodate a further fastening device.
Figure 6:
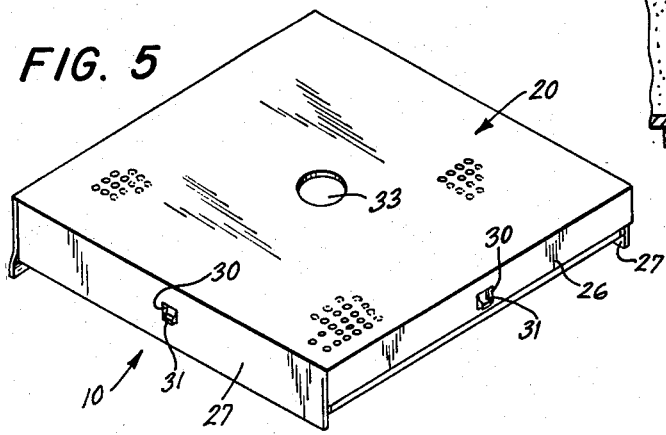
FIG. 6 is a detail sectional view showing the additional fastening device applied to the modified filter box.

A supplementary retaining or fastening means is illustrated in FIG. 5 and 6 which serves to prevent the central portion of the box from bowing outwardly. Thus, the central portion of the cover and base members may be provided with apertures 33 in registry with each other. When the cover and box members have been assembled, a pair of dished washers or fittings 34 are inserted in the apertures as shown in FIG. 6. In this connection, rubber, fiber, plastic or other cushioning gaskets 35 may be inserted beneath the fittings around the apertures 33. The washers or fittings 34 are provided with central apertures through which a machine screw or bolt 36 is inserted to be engaged by a nut 37 and lock washer 38.

This form of box is also provided with the releasable fastening means shown in the first form of my invention, namely the recesess 30 in the cover member and the cantilever detents 31 in the base or box member.

The cover and box members may be made of suitable material, preferably a metal such as steel, stainless steel, aluminum, aluminum alloys or copper alloys. I have found that aluminum serves satisfactorily for this purpose because of its light weight and its resistance to corrosion. Any of the indicated metals has sufficient resiliency so as to impart the required spring characteristics to the cantilever detents 31 so that they can be snapped into place in assembling the box and cover members and so that they can be pressed inwardly to release them.

In using my new filter boxes, the covers are removed from the box or base members and they are filled with suitable granulated filter material, preferably an adsorbent material such as activated charcoal, activated alumina or activated silica. The particle size of the granulated material is not critical, but I have found that satisfactory results are obtained where mixtures of different size particles are used. After the box member has been filled with the granular material, the cover is assembled thereon simply by telescoping it into place over the box or base member. When fully telescoped into position, the cantilever detents will snap into place in engagement with the recesses 30, thereby releasably retaining the box in assembled relationship.

In the form of box shown in FIGS. 5 and 6, the washers or fittings 34 and the nut and bolt 36 and 37 are assembled through the apertures 33 in the box and cover members to releasably retain them in assembled relationship.

When the filter boxes filled with granulated filter material have thus been assembled, they are arranged in stacked or superimposed relationship within the cabinet 12 as shown with the adjacent boxes oriented at 180 degrees to each other. Thus, the short side walls 26 and the long side walls 28 of cover member 20 will face towards the entry and exit faces of the cabinet as shown most clearly in FIG. 2.

Gaseous material to be cleaned and purified is then introduced in a stream between the boxes through the front face of the cabinet. Due to the baffling effect of the relatively longer side walls 27 and 28, the gaseous material is forced to enter through the apertures in the boxes through the granular filter material out through the other side thereof and thence outwardly through the exit face of the cabinet. The filter bed of granular material serves to filter or screen particulate impurities out of the gaseous material and also serves to adsorb impurities in the form of gases, vapors or liquids.

It will thus be seen that I have provided an improved filter box having relatively few parts, which is relatively inexpensive to manufacture and assemble, which has a minimum amount of waste space so as to hold a maximum amount of granular filter material, which is simple to open and close so that the granular filter material may be replaced or reactivated and which has self-contained spacers and baffles to maintain the filter boxes in properly spaced superimposed and aligned relationship and so as to prevent the gaseous material from by-passing the filter boxes.

Modifications may be made in the illustrated and described embodiments of my invention without departing from the invention as set forth in the accompanying claims.

I claim:

1. A filter box assembly comprising a plurality of similar and stacked filter boxes, each filter box holding granular filter material and adapted to be assembled in stacked relationship with other similar filter boxes in a stream of gaseous material to remove impurities therefrom comprising first and second complementary box members having telescopic engagement with each other and each formed of a transverse end panel and peripheral side walls disposed substantially at right angles thereto with the side walls of one member being spaced a slightly greater distance apart than the side walls of the other member so as to have overlapping sliding engagement with the side walls of the other member and the side walls of one member having recesses formed therein while the corresponding side walls of the other member are made of inherently resilient material and have laterally offset complementary tongues integrally connected to said side walls at one end and being offset at an angle from the planes of said side walls into the planes of the corresponding side walls of said one member and being in registry with the recesses when the members are fully engaged so as to interengage therewith and retain the members in assembled relationship, two opposed side walls of said one member engaging the transverse end panel of the said one member of the neighboring filter box in this stack, and the transverse end panel of each box member having openings therethrough to permit the gaseous material to pass through the granular material.

2. A filter box assembly comprising a plurality of similar and stacked filter boxes, each filter box holding granular filter material and adapted to be assembled in stacked relationship with other similar filter boxes in a stream of gaseous material to remove impurities therefrom comprising first and second complementary box members having telescopic engagement with each other and each formed of a transverse end panel and peripheral side walls disposed substantially at right angles thereto with the side walls of one member being spaced a slightly greater distance apart than the side walls of the other member so as to have overlapping sliding engagement with the side walls of the other member and the side walls of one member having recesses formed therein while the corresponding side walls of the other member are made of inherently resilient material and have laterally offset complementary detents in the form of cantilevers integrally connected to said side walls at their ends disposed nearer the outer ends of said walls and extending at an angle away from the outer ends of the side walls and terminating in abutment faces at their free ends, said cantilevers being offset at an angle from the planes of said side walls into the planes of the corresponding side walls of said one member and being in registry with the recesses when the members are fully engaged so as to interengage therewith with the abutment faces of the cantilevers confronting side edges of the recesses to thereby retain the members in assembled relationship, two opposed side walls of said one member engaging the transverse end panel of the said one member of the neighboring filter box in this stack, and the transverse end panel of each box member having openings therethrough to permit the gaseous material to pass through the granular material.

3. A filter box assembly comprising a plurality of similar and stacked filter boxes, each filter box holding granular filter material and adapted to be assembled in stacked relationship with other similar filter boxes in a stream of gaseous material to remove impurities therefrom comprising first and second complementary box members having telescopic engagement with each other and each formed of a transverse end panel and peripheral side walls disposed substantially at right angles thereto with the side walls of the first member being spaced a slightly greater distance apart than the side walls of the second member so as to have overlapping sliding engagement therewith, the side walls of the second member all being of uniform height and three of the overlapping side walls of the first member being of greater height than the fourth side wall of said member and than the side walls of the second member, the two opposite side walls of greater height of said first member being of uniform height and projecting beyond the box when it is telescopically assembled and resting on the surface of a neighboring box in the stack and the third side wall of greater height of said first member having a height dimension at least as great as said two opposite side walls so as to serve as a baffle to prevent the passage of gaseous material thereby when the said box is assembled with other similar boxes in stacked relationship, and the transverse end panels of each box member having openings therethrough to permit the gaseous material to pass through the granular material.

4. A filter box assembly comprising a plurality of similar and stacked filter boxes, each filter box for holding granular filter material and adapted to be assembled in stacked relationship with other similar filter boxes in a stream of gaseous material to remove impurities therefrom as set forth in claim 3 in which said first and second complementary box members are provided with interengageable releasable fastening means so as to releasably retain the box in assembled relationship.

5. A filter box assembly comprising a plurality of similar and stacked filter boxes, each filter box for holding granular filter material and adapted to be assembled in stacked relationship with other similar filter boxes in a stream of gaseous material to remove impurities therefrom as set forth in claim 3 in which the side walls of one of the members are provided with recesses while the corresponding side walls of the other member are made of inherently resilient material and have detents in the form of laterally offset cantilevers integrally connected to the side walls at the end nearer to the outer end of the side walls and extending at an angle away from said outer ends and having abutment faces at their outer ends, said cantilevers being offset at an angle from the planes of said side walls into the planes of the corresponding side walls of said one member and being in registry with the recesses when the complementary box members are fully engaged with the abutting faces in confronting relationship with side edges of the recesses so as to releasably retain the members in assembled relationship.

6. A filter box assembly comprising a plurality of similar and stacked filter boxes, each filter box holding granular filter material and adapted to be assembled in stacked relationship with other similar filter boxes in a stream of gaseous material to remove impurities therefrom comprising first and second complementary box members having telescopic engagement with each other and each formed of a rectangular perforated transverse end panel and four peripheral side walls disposed substantially at right angles to each other and to the end panel, the end panel of said first member being slightly larger than the end panel of said second member with the side walls of said first member being spaced a slightly greater distance apart than the side walls of the second member so as to have overlapping sliding engagement therewith, the side walls of said second member being of uniform height and three of the side walls of the first member being of greater height than the fourth side wall of said first member and also being of greater height than the side walls of said second member, the said two opposite side walls of greater height of said first member being of uniform height and extending beyond the box when the box members are telescopically assembled and being adapted to engage the surface of another similar box when in stacked relationship therewith to maintain said boxes in spaced relationship and the third side wall of greater height of said first box member having a greater height dimension than the two opposite side walls of greater height and being laterally offset in an outward direction so as to engage the side edge of another similar box when the boxes are in stacked relationship to serve as a baffle to prevent the passage of gaseous material thereby, and the transverse end panel of each box member having openings therethrough to permit the gaseous material to pass through the granular material.

7. A filter box assembly comprising a plurality of similar and stacked filter boxes, each filter box for holding granular filter material and adapted to be assembled in stacked relationship with other similar filter boxes in a stream of gaseous material to remove impurities therefrom as set forth in claim 6 in which the complementary box members are provided with releasable fastening means to releasably retain the box in assembled relationship.

8. A filter box assembly comprising a plurality of similar and stacked filter boxes, each filter box for holding granular filter material and adapted to be assembled in stacked relationship with other similar filter boxes in a stream of gaseous material to remove impurities therefrom as set forth in claim 6 in which the side walls of one member are provided with recesses and the side walls of the other member are made of inherently resilient material and have complementary detents in the form of cantilevers integrally connected to said side walls at their ends nearer to the outer ends of the side walls and extending at an angle away from the outer ends of the side walls and having abutment faces at their outer ends, said cantilevers being offset at an angle from the planes of said side walls into the planes of the corresponding side walls of said one member and being in registry with the recesses when the members are fully engaged with the abutment faces in confronting relationship with edges of the recesses so as to releasably retain the members in assembled relationship.

References Cited by the Examiner

UNITED STATES PATENTS

| | | | |
|---|---|---|---|
| 296,758 | 4/84 | Kutsche | 55—484 |
| 1,015,455 | 1/12 | Neesham | 220—8 |
| 1,195,295 | 8/16 | Turner. | |

(Other references on following page)

UNITED STATES PATENTS

| | | | |
|---|---|---|---|
| 1,215,974 | 2/17 | Orem | 55—510 |
| 1,521,576 | 12/24 | Wittemeier | 55—350 |
| 2,033,665 | 3/36 | Young | 55—350 |
| 2,055,774 | 9/36 | Ray | 55—484 |
| 2,456,481 | 12/48 | Ballantyne et al. | 220—97 |
| 2,782,950 | 2/57 | Corr | 220—97 |
| 2,981,367 | 4/61 | Sprouse. | |

FOREIGN PATENTS

| | | |
|---|---|---|
| 482,543 | 3/38 | Great Britain. |

HARRY B. THORNTON, *Primary Examiner*.